(12) United States Patent
Nakanishi

(10) Patent No.: US 7,887,973 B2
(45) Date of Patent: Feb. 15, 2011

(54) CELL MODULE AND FUEL CELL HAVING A WATER PERMEABLE HOLLOW BODY

(75) Inventor: Haruyuki Nakanishi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1013 days.

(21) Appl. No.: 11/597,403

(22) PCT Filed: Jun. 8, 2005

(86) PCT No.: PCT/IB2005/001600

§ 371 (c)(1),
(2), (4) Date: Nov. 24, 2006

(87) PCT Pub. No.: WO2005/122307

PCT Pub. Date: Dec. 22, 2005

(65) Prior Publication Data

US 2007/0218337 A1    Sep. 20, 2007

(30) Foreign Application Priority Data

Jun. 11, 2004    (JP) ............................ 2004-174736

(51) Int. Cl.
H01M 8/10    (2006.01)

(52) U.S. Cl. .................. 429/497; 429/482; 429/466; 429/413; 429/450

(58) Field of Classification Search ............ 429/30, 429/31, 34, 38, 32
See application file for complete search history.

(56) References Cited

U.S. PATENT DOCUMENTS

| | | | |
|---|---|---|---|
| 3,620,844 A * | 11/1971 | Wicke et al. | ............... 429/44 |
| 5,928,808 A | 7/1999 | Eshraghi | |
| 6,338,913 B1 | 1/2002 | Eshraghi | |
| 6,399,232 B1 | 6/2002 | Eshraghi | |
| 6,403,248 B1 | 6/2002 | Eshraghi | |
| 6,403,517 B1 | 6/2002 | Eshraghi | |
| 6,444,339 B1 | 9/2002 | Eshraghi | |
| 6,495,281 B1 | 12/2002 | Eshraghi | |
| 2004/0175605 A1 | 9/2004 | Eshraghi et al. | |

FOREIGN PATENT DOCUMENTS

| | | |
|---|---|---|
| CN | 1466783 A | 1/2004 |
| JP | A-06-084532 | 3/1994 |
| JP | A 09-223507 | 8/1997 |
| JP | A 2001-229933 | 8/2001 |
| JP | A 2002-124273 | 4/2002 |
| JP | A 2002-158015 | 5/2002 |

(Continued)

OTHER PUBLICATIONS

Mar. 26, 2010 Notification of Reasons for Rejection issued in JP 2004-174736 with partial English-language translation.

*Primary Examiner*—Raymond Alejandro
(74) *Attorney, Agent, or Firm*—Oliff & Berridge, PLC

(57) ABSTRACT

A cell module includes a cell module body having a tube-shape. The cell module body includes a tube-shaped inner electrode and a tube-shaped outer electrode. The inner electrode is within the outer electrode. The inner electrode forms a hollow portion. The cell module also includes a water permeable hollow body arranged within the hollow portion.

8 Claims, 3 Drawing Sheets

FOREIGN PATENT DOCUMENTS

| | | |
|---|---|---|
| JP | A-2002-516466 | 6/2002 |
| JP | A 2002-260685 | 9/2002 |
| JP | A-2004-505417 | 2/2004 |
| JP | A-2004-520684 | 7/2004 |
| JP | A-2005-166552 | 6/2005 |
| JP | A-2005-531911 | 10/2005 |
| WO | WO 99/60642 | 11/1999 |
| WO | WO 02/09212 A1 | 1/2002 |
| WO | WO 2004/006377 A1 | 1/2004 |
| WO | WO 2004/021494 * | 11/2004 |

* cited by examiner

CELL MODULE AND FUEL CELL HAVING A WATER PERMEABLE HOLLOW BODY

BACKGROUND OF THE INVENTION

1. Field of the Invention

The invention relates to a fuel cell provided with a cell module having a hollow electrolyte membrane.

2. Description of the Related Art

A fuel cell converts chemical energy directly into electrical energy by providing a fuel and an oxidant to two electrodes that are electrically connected and electrochemically oxidizing the fuel. As opposed to thermal power generation, fuel cells display good energy conversion efficiency because they are not subject to the Carnot cycle restriction. Proton-exchange membrane fuel cells (PEMFC) are fuel cells which use a solid polymer electrolyte membrane as the electrolyte. These fuel cells are advantageous in that they operate at low temperatures and can easily be made small, which makes them particularly attractive as mobile power sources as well as power sources for mobile objects.

In a typical proton-exchange membrane fuel cell, when hydrogen is supplied as the fuel, the reaction shown in expression (1) progresses at the anode.

$$H_2 \rightarrow 2H^+ + 2e^-:$$ Expression (1)

The electrons produced by expression (1) pass through an external circuit and do work at an external load, after which they arrive at the cathode. The protons produced by expression (1) move through the proton-exchange membrane fuel cell from the anode side to the cathode side in a hydrated state by electro-osmosis.

When oxygen is supplied as the oxidant, the reaction shown in expression (2) progresses at the cathode.

$$2H^+ + (\tfrac{1}{2})O_2 + 2e^- \rightarrow H_2O:$$ Expression (2)

Water produced at the cathode primarily passes through a gas diffusion layer and is then discharged outside of the fuel cell. Thus, fuel cells are clean power generating devices which emit only water.

Conventionally, most of the proton-exchange membrane fuel cells developed have a fuel cell stack which is made up of a plurality of stacked flat single cells. These single cells are manufactured by providing an anode catalyst layer on one side of a planar solid polymer electrolyte membrane and a cathode catalyst layer on the other side of the membrane so as to form a planar membrane-electrode assembly (MEA). A gas diffusion layer is then provided on both sides of this membrane-electrode assembly. Lastly, membrane-electrode assembly is sandwiched between planar separators.

In order to improve the output density of the proton-exchange membrane fuel cell, a very thin proton-conducting polymer membrane is currently used as the solid polymer electrolyte membrane. The thickness of this membrane is usually 100 μm or less. Even if an even thinner electrolyte membrane is used to further improve output density, the single cell still cannot be made dramatically thinner than it currently is. Similarly, the catalyst layers, gas diffusion layers, and separator, and the like are being made thinner, but even if all of the members were made thinner, there is still a limit to how much the output density per unit volume can be improved.

Also, carbon material in sheet form, which is highly corrosive, is normally used for the separator. The carbon material itself is very costly. Moreover, because grooves for gas flow paths are usually micro-machined in the surface of the separator in order to allow the fuel gas and oxidant gas to spread substantially evenly over the entire surface of the planar membrane-electrode assemblies, the cost of the separators is extremely high which increases the manufacturing cost of the fuel cell.

In addition to the foregoing problems, many more problems exist. For example, securely sealing the area around the plurality of stacked single cells so that fuel gas and oxidant gas do not leak from the gas flow paths is technically difficult in flat single cells. Also, bending or deformation of the planar membrane-electrode assemblies may result in a decrease in power generation efficiency.

In recent years, proton-exchange membrane fuel cells have been developed in which power generation is basically based on a cell module that has an electrode provided on both the inner surface side and the outer surface side of a hollow electrolyte membrane (for example, JP(A) 9-223507, JP(A) 2002-124273, JP(A) 2002-158015, and JP(A) 2002-260685).

A fuel cell having this kind of hollow cell module normally does not require the use of a member corresponding to a separator that is used in a flat fuel cell. Further, because power is generated by supplying a different type of gas to the inner side than is supplied to the outer side, there is also no particular need to form gas flow paths. Accordingly, low manufacturing costs can be expected. Moreover, the cell module has a 3-dimensional shape, so the specific surface area with respect to the volume is larger than it is with a flat single cell, which means that an increase in power generation output density per volume is expected.

Normally in a fuel cell with a hollow cell module such as that described above, a fuel gas including hydrogen or an oxidant gas such as air is supplied to the hollow inner portion, and an oxidant gas such as air or a fuel gas including hydrogen, which will react with the gas supplied to the hollow inner portion, is supplied to the cell module outer portion. Many electrolyte membranes are proton conductive, such that protons move in a hydrated state by electro-osmosis through the solid polymer electrolyte membrane from the anode (fuel electrode) side to the cathode (oxidant electrode) side, as described with regard to Expression (1) above. Accordingly, when the hollow inner portion is made the anode and power is generated by supplying hydrogen thereto, there may be a lack of moisture at the anode and electrolyte membrane on the anode side. As a result, good power generation may no longer be able to be achieved.

JP(A) 9-223507 discloses a fuel cell in which a positive electrode and a negative electrode are formed on a portion of a polymer electrolyte hollow fiber as a power generating portion, and a humidifying portion is provided in a different location than the power generating portion of the polymer electrolyte hollow system. In this fuel cell, air is supplied as the oxidant to the outer surface of the polymer electrolyte hollow system of the power generating portion, deionized water is supplied to the outer surface of the polymer electrolyte hollow system of the humidifying portion, and hydrogen is supplied as the fuel to the inner surface of the polymer electrolyte hollow system. Because of the nature of the polymer electrolyte to allow only deionized water to permeate it, the hydrogen that passes through the inner surface of the polymer electrolyte hollow system is humidified by the humidifying portion. Supplying this humidified hydrogen to the power generating portion prevents the power generating portion (i.e., the anode) on the inner surface of the hollow system from becoming dry. With this technology, however, there is a portion of the surface of the polymer electrolyte hollow system that is not used as an electrode, which restricts the electrode area.

In view of the foregoing problems, this invention thus provides a fuel cell having a hollow cell module, which is provided with a humidifying mechanism to effectively prevent the cell module from becoming dry.

SUMMARY OF THE INVENTION

In order to solve the foregoing problems, a cell module for a fuel cell according to the invention is provided with a cell module body which includes a pair of electrodes, one provided on an inner surface of a hollow electrolyte membrane and the other provided on an outer surface of the hollow electrolyte membrane, and collectors, a respective one of the collectors being in contact with a respective one of the electrodes of the cell module body, and is characterised in that a water permeable hollow body, which has an outer diameter that is smaller than an inner diameter of the cell module body and is provided with a hollow portion capable of supplying water, is arranged within a hollow portion of the cell module body.

Thus, because a water permeable hollow body, which has an outer diameter that is smaller than an inner diameter of the cell module body and is provided with a hollow portion capable of supplying water, is arranged within the hollow portion of the cell module body in this way, by supplying water to the water permeable hollow body, that water is supplied to the outer portion of the water permeable hollow body, thereby enabling the electrode and the electrolyte membrane to be humidified from the inner surface side of the cell module.

Also, in the cell module according to the invention, the water permeable hollow body can be a tube shaped structure in which both ends are open, and in which water can flow from one end side of the hollow portion to the other end side thereof. Further, the water permeable hollow body may also be of a tube shape in which only one end is open.

Moreover, the cell module can be of a structure in which an electrode that produces water is provided on an outer surface side of the hollow electrolyte membrane. Further, the cell module can be structured such that an electrode which does not produce water is provided on an inner surface side of the hollow electrolyte membrane.

Also, the cell module can also be structured such that the water permeability of the water permeable hollow body decreases from the upstream side toward the downstream side with respect to the flow of reaction gas flowing to the hollow portion of the cell module body. A fuel cell having this cell module for a fuel cell is able to be sufficiently humidified, thus reducing the possibility of decreased output which occurs when the electrode and electrolyte membrane become dry.

According to the fuel cell and cell module for a fuel cell according to the invention, water supplied to the water permeable hollow body is supplied into the hollow portion of the hollow electrolyte membrane, thereby humidifying the electrode and electrolyte membrane from the inner surface side of the cell module. As a result, the electrode and electrolyte membrane are less apt to become dry following power generation.

The fuel cell having this kind of cell module is able to appropriately management the moisture of the electrolyte membrane, regardless of the outside humidity or the duration of power generation. As a result, stable power generation is able to be performed.

In particular, a great humidifying effect is able to be obtained and the moisture is able to be easily managed when a structure is employed in which an electrode that produces water is provided on the outer surface side of a hollow electrolyte membrane of a cell module.

DETAILED DESCRIPTION OF THE PREFERRED EMBODIMENTS

Hereinafter, a fuel cell according to the invention will be described in an exemplary case in which a fluorinated ion exchange resin membrane, which is one kind of proton conducting membrane, is used as the electrolyte membrane.

Figure 1:
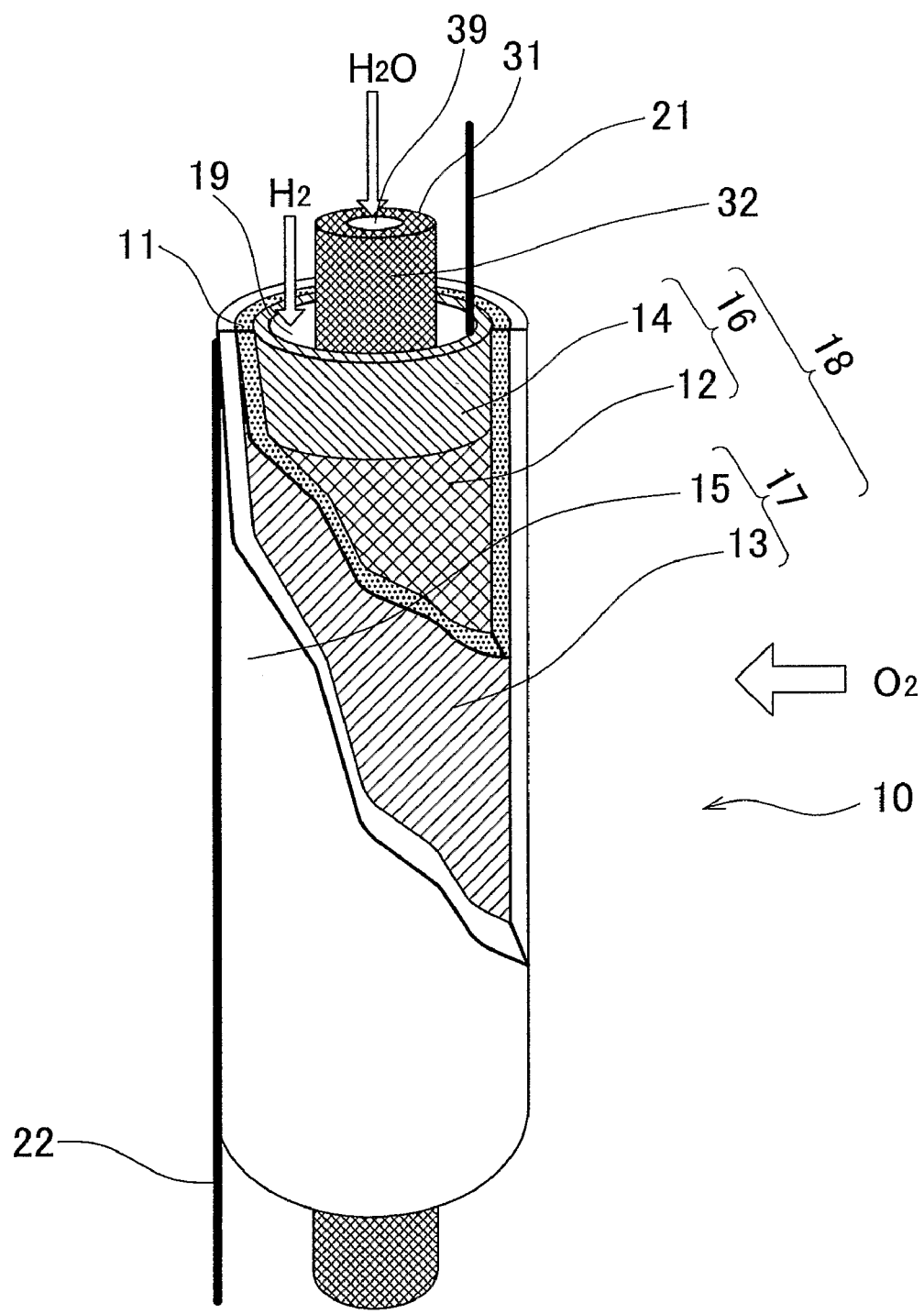
FIG. 1 is a perspective view of a cell module according to the invention.
Figure 2:
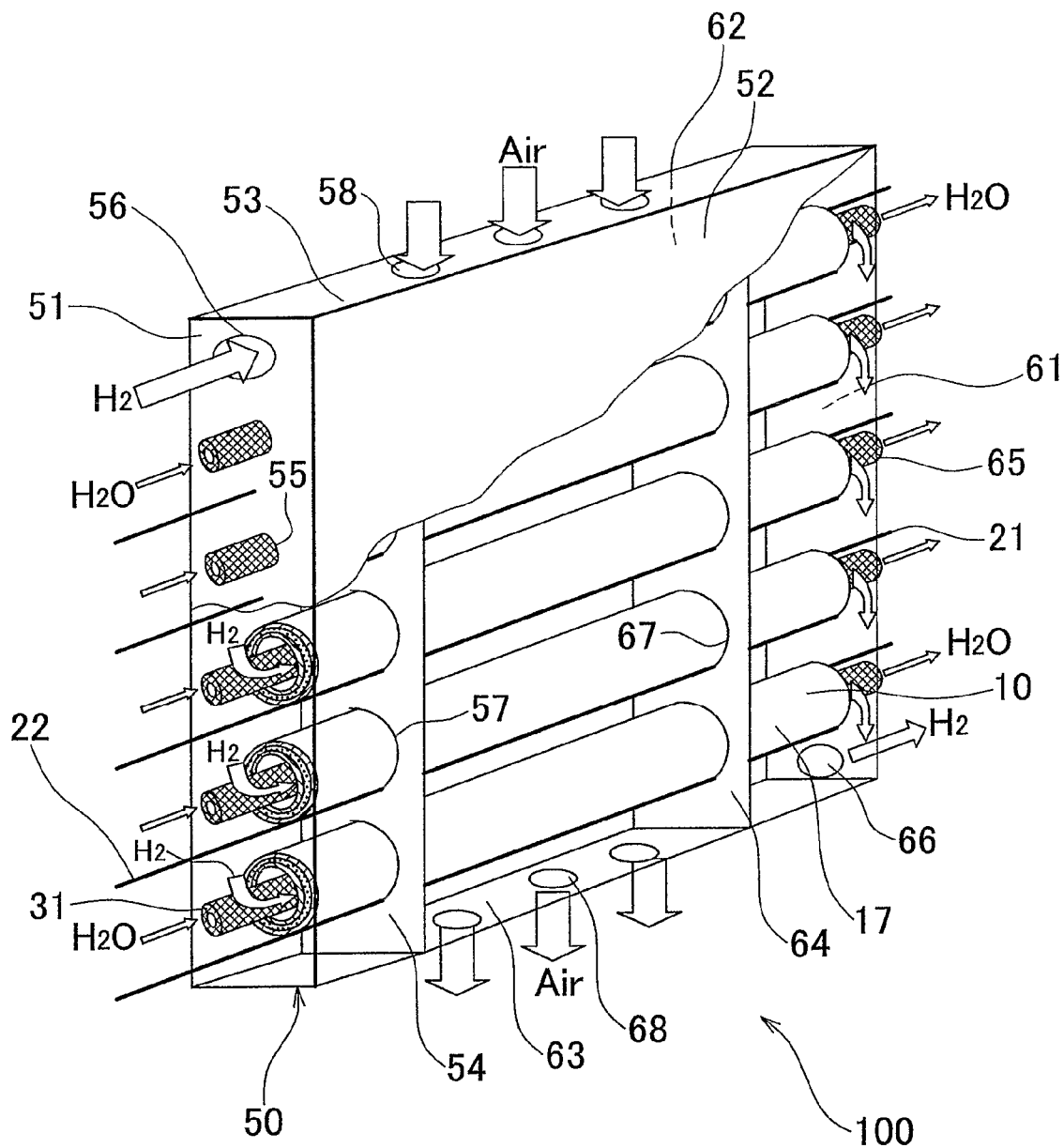
FIG. 2 is a perspective view of a cell module assembly according to the invention.
Figure 3:
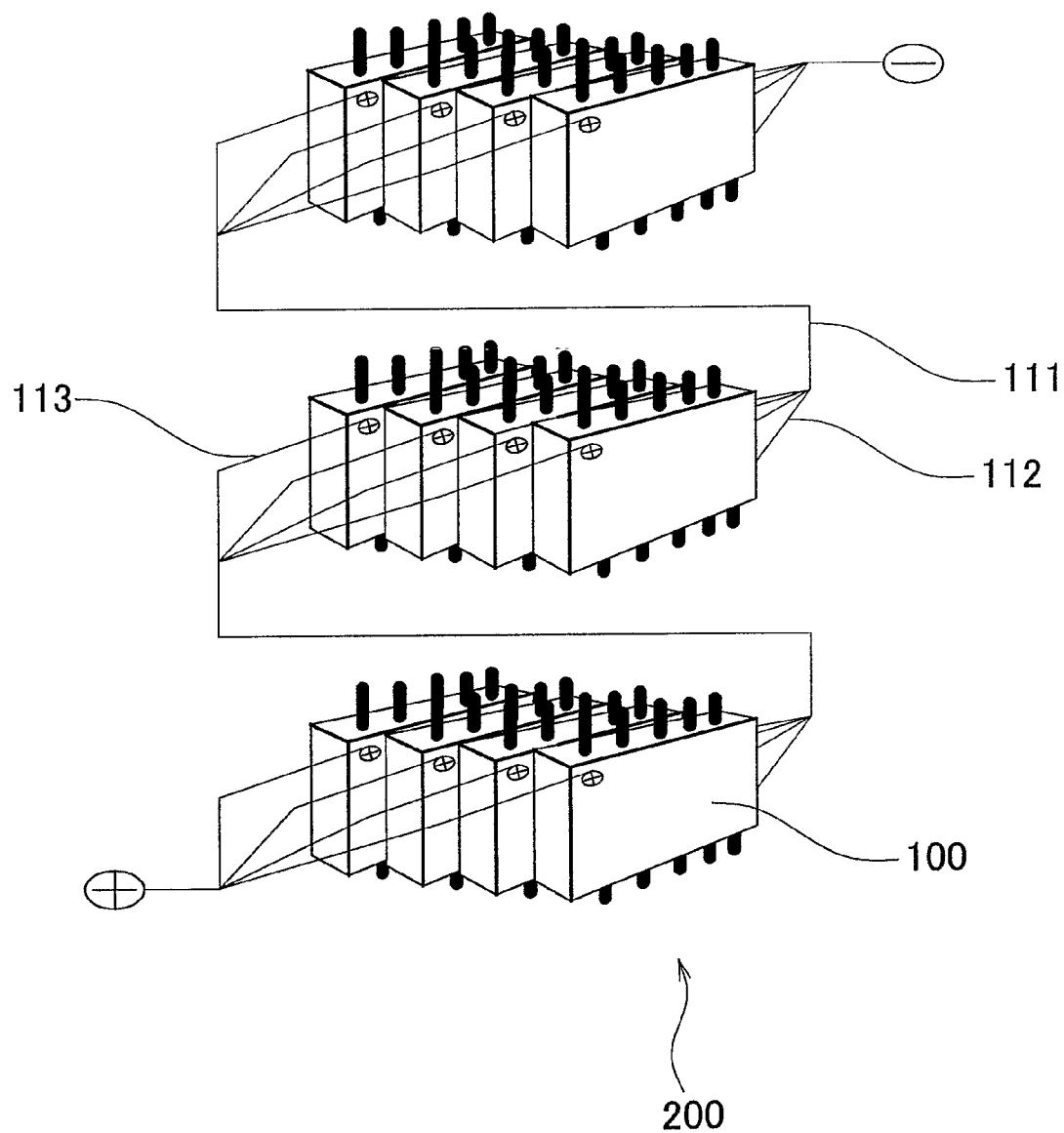
FIG. 3 is a view schematically showing one example of the manner in which cell module assemblies are connected.

First, a fuel cell according to one exemplary embodiment of the invention will be described with reference to FIGS. 1 to 3. FIG. 1 is a perspective view of a cell module with a portion of the structural members cut away to facilitate understanding. FIG. 2 is a perspective view of a cell module assembly in which five cell modules have been assembled together. Portions of a front plate 52 and a side plate 51 on the near side in the drawing have been made transparent to facilitate understanding. FIG. 3 is a view schematically showing one example of the manner in which cell module assemblies are connected.

A cell module 10 shown in FIG. 1 is hollow, that is, tube-shaped, with both ends open. The cell module 10 includes a tube-shaped electrolyte membrane (a fluorinated ion exchange resin membrane) 11; a membrane-electrode assembly 18, i.e., the cell module body in this exemplary embodiment, which includes a first electrode (in this case, an anode) 16 provided on the inner surface side of the electrolyte membrane 11 and a second electrode (in this case, a cathode) 17 provided on the outer surface side of the electrolyte membrane 11; a first collector 21 which is inserted into a hollow portion 19 of the cell module 10 and provided in close contact with the surface, on the inner surface side, of the first electrode 16; a second collector 22 which is provided in close contact with the outer surface side of the cell module 10; and a humidifying pipe 31 which is inserted into the hollow portion 19.

The cell module 10 in this exemplary embodiment is characteristic in that it is hollow. More particularly, the cell module 10 in this exemplary embodiment is tube shaped, but it is not limited to being tube shaped as long as it has a hollow portion and can supply a reaction component necessary for an electro-chemical reaction to the first electrode by flowing a reaction gas into the hollow portion.

Having the cell module 10 be hollow is advantageous for a variety of reasons. Two great advantages in particular are that it obviates the need for a separator, and that it increases the electrode area effective for generating power.

Further, the fluorinated ion exchange resin membrane 11 of this exemplary embodiment is also tube shaped with both ends open. The outer diameter of the tube-shaped hollow electrolyte membrane 11 is not particularly limited, but is preferably 0.01 to 10 mm, inclusive, more preferably 0.1 to 1 mm, inclusive, and even more preferably, 0.1 to 0.5 mm, inclusive. A tube-shaped hollow electrolyte membrane 11 with an outer diameter of less than 0.01 mm is, at present, technically difficult to manufacture. With an outer diameter of greater than 10 mm, on the other hand, a sufficient effect of improving power generation output per unit volume of the cell module obtained may not be able to be obtained due to the fact that the surface area with respect to the occupied volume does not get very large.

The fluorinated ion exchange resin membrane 11 is preferably thin to improve proton conductivity, but if it is too thin, the gas separating function decreases, resulting in an increase in the permeation amount of aprotic hydrogen. Compared with a related fuel cell in which flat single cells for a fuel cell are stacked together, however, with a fuel cell produced by assembling together many hollow cell modules 10 according to the invention, the electrode area effective for generating power can be made large, such that sufficient output is displayed even when a fairly thick membrane is used. From this viewpoint, the thickness of the fluorinated ion exchange resin membrane 11 is typically 10 to 100 μm, inclusive, preferably 50 to 60 μm, inclusive, and more preferably 50 to 55 μm, inclusive.

Further, from the preferable range of the foregoing outer diameter and membrane thickness, the preferable range for the inner diameter is 0.01 to 10 mm, inclusive, more preferably 0.1 to 1 mm, inclusive, and more preferably 0.1 to 0.5 mm, inclusive.

The fluorinated ion exchange resin membrane 11 is preferably a polymer having a polyolefin skeleton in which part or all of the hydrogen has been replaced with fluorine, and has a proton exchange group on a side chain. Some preferable examples of the proton exchange group include a sulfonic acid group, a phosphonic acid group, and a phosphate group. A particularly preferable fluorinated ion exchange resin is a perfluorocarbon polymer having a sulfonic acid group (i.e., a perfluorocarbon sulfonic acid polymer). Some perfluorocarbon sulfonic acid polymers are commercially available, such as Nafion® from Dupont of the US and Flemion® from Asahi Glass Co., Ltd.

The weight-average molecular weight of a polymer forming the fluorinated ion exchange resin membrane 11 is preferably at least 5000 from the viewpoint of durability.

Also, this exemplary embodiment describes the fluorinated ion exchange resin membrane 11, which is one solid polymer electrolyte membrane, i.e., one kind of proton conducting membrane, used as the electrolyte membrane 11. The fuel cell of this invention, however, has the hollow cell module 10 which enables the electrode area per unit volume to be made large compared with a fuel cell that has a flat cell. Therefore, even if an electrolyte membrane is used that does not have proton conductivity as high as that of a perfluorocarbon sulfonic acid membrane, a fuel cell can still be obtained that has a high output density per unit volume. Therefore, as the solid polymer electrolyte membrane, in addition to perfluorocarbon sulfonic acid, most of the materials that are used for the electrolyte membranes of polymer electrolyte membrane fuel cells can be used. These include, for example, material having at least one type of proton exchange group such as a sulfonic acid group, a phosphonic acid group, and a phosphate group and the like, which has, as a skeleton, a hydrocarbon such as a polyolefin of, for example, a polystyrene cation exchange membrane having a sulfonic acid group, and a solid polymer electrolyte membrane made up of a complex of a strong acid and a basic polymer in which a basic polymer such as poly benzimidazole, poly pyrimidine, or poly benzoxazole has been doped with a strong acid.

Further, the proton conductive electrolyte membrane is not limited to a solid polymer electrolyte membrane such as that described above. Alternatively, for example, a porous electrolyte plate impregnated with a phosphoric acid aqueous solution, phosphate glass in a hydro-gel form, an organic-inorganic hybrid proton conducting membrane in which a proton conductive functional group has been introduced into micro-holes and onto a surface of porous glass having nanopores, or an electrolyte polymer membrane reinforced with inorganic metal fiber can also be used.

The electrodes 16 and 17 provided on the inner surface and outer surface, respectively, of the electrolyte membrane (i.e., the fluorinated ion exchange resin membrane) 11 can be formed using electrode material such as that used in a typical polymer electrolyte membrane fuel cell. Normally an electrode is used that is formed of catalyst layers 12 and 13 and gas diffusion layers 14 and 15 laminated together in that order from the electrolyte membrane side.

The catalyst layers 12 and 13 include catalyst particles, and may also include proton conductive material to increase the usability of those catalyst particles. For this proton conductive material, a material that can be used as material of the electrolyte membrane can be used. As the catalyst particles, catalyst particles in which the catalyst component is carried on conductive material such as carbon, e.g., carbonaceous particles or carbonaceous fibers, is preferably used. Because the fuel cell of the invention has a hollow cell module, the electrode area per unit volume is able to be made large compared with a fuel cell having a flat cell. Therefore, even if a catalyst component is used which does not have a catalyst action as great as that of platinum, a fuel cell is still able to be obtained that has a high output density per unit volume. The catalyst component is not particularly limited so long as it has a catalyst action with respect to an oxidative reaction of hydrogen in the anode and a reductive reaction of the oxygen in the cathode. For example, the catalyst component may be selected from a metal such as platinum, ruthenium, iridium, rhodium, palladium, osmium, tungsten, lead, ferrum, chrome, cobalt, nickel, manganese, vanadium, molybdenum, gallium, aluminum, or an alloy thereof. Preferably, however, the catalyst component is Pt or an alloy of Pt and another metal such as Ru, for example.

For the gas diffusion layers 14 and 15, a conductive material of which the main component is carbon material such as carbonaceous particles and/or carbonaceous fibers can be used, or porous metal material such as nickel or stainless steel which have excellent resistance to corrosion can be used. Preferably, a conductive material of which the main component is carbon material such as carbonaceous particles and/or carbonaceous fibers is used. The size of the carbonaceous particles and the thickness and length of the carbonaceous fibers may be selected so that they are optimal considering various factors such as dispersibility in the solution when manufacturing the gas diffusion layers 14 and 15, and drainage of the obtained gas diffusion layers 14 and 15. In order to increase the drainage of moisture such as the produced water, the gas diffusion layers are preferably either impregnated with, for example, polytetrafluoroethylene, polyvinylidene fluoride (PVDF), perfluorocarbon alkoxyalkane, ethylenetetrafluoroethylene polymer, or a compound of thereof, or undergo water repellent finishing in which, for example, a water repellent layer is formed using the foregoing substances.

The structure of the electrodes 16 and 17 formed on the inner surface and outer surface, respectively, of the electrolyte membrane 11 and the materials and the like used in the electrodes 16 (i.e., 12 and 14) and 17 (i.e., 13 and 15) may be the same or different.

The collectors are conductive bodies for leading the electric charge generated at the electrodes to an eternal circuit. In this exemplary embodiment, the collectors are lead wires 21 and 22 provided adhered to the gas diffusion layers 14 and 15.

The form and material of the collectors 21 and 22 are not particularly limited, however. Exemplary materials of the collectors 21 and 22 are foil or wire rods of a metal such as stainless steel. As a method of adhesion, the lead wires 21 and 22 can be adhered to the electrodes with a carbon conductive binding material or Ag paste or the like.

Next, the humidifying pipe 31, which is a water permeable hollow body having a hollow portion capable of supplying water, will be described.

The humidifying pipe 31 provided in the hollow inner portion 19 of the cell module 10 of this exemplary embodiment is a hollow pipe (i.e., a water permeable hollow body), as is evident from FIG. 1, which is made of water permeable material. Water flows through a hollow portion 39 of the humidifying pipe 31 by water circulating means, not shown. This water passes through a wall portion 32 of the humidifying pipe 31, which is made of water permeable material, to the outside of the humidifying pipe 31 and humidifies the reaction gas supplied to the hollow inner portion 19 of the cell module 10 around that area.

Examples of the water permeable material include a variety of types of porous bodies and water permeable resins, and the like. The variety of types of porous bodies includes porous glass, porous ceramic, porous metal, porous carbon, and porous resin, and the like. Also, examples of water permeable resins include perfluorocarbon sulfonic acid polymers such as Nafion®, and PTFE, and the like. Of these water permeable materials, PTFE, PVPF, or the like is preferable. PTFE or nylon is particularly preferable.

The outer diameter of the humidifying pipe 31 is smaller than the inner diameter of the hollow portion 19 of the membrane-electrode assembly 18. The diameter of the humidifying pipe 31 is preferably at least 1 mm, and more preferably, at least 1.5 mm smaller than the inner diameter of the hollow portion 19 of the cell module body (i.e., the membrane-electrode assembly 18 in this case). Alternatively, the outer diameter of the humidifying pipe 31 may be equal to or less than 50%, and preferably equal to or less than 60%, of the inner diameter of the hollow portion 19 of the cell module body 18. Using a humidifying pipe 31 which has an outer diameter that is smaller than the inner diameter of the membrane-electrode assembly 18 in this way creates a space between the membrane-electrode assembly 18 and the humidifying pipe 31 through which the reaction gas can flow.

The water permeability of this humidifying pipe 31 may be controlled by adjusting the thickness of the wall portion 32 of the humidifying pipe 31, for example. When porous material is used, the water permeability of this humidifying pipe 31 may be controlled by adjusting the hole ratio or the average hole diameter. Also, when a water permeable resin is used, the water permeability may be controlled by adjusting the ratio of hydrophilic functional groups to hydrophobic functional groups contained in the resin, for example.

Further, the water permeability of the wall portion 32 of the humidifying pipe 31 may be gradated in the direction of flow of the reaction gas which is flowed to outside the humidifying pipe 31, i.e., to the hollow portion 19 of the membrane-electrode assembly 18. By making the water permeability of the humidifying pipe wall portion 32 gradually less from the upstream side toward the downstream side of the reaction gas flow, it is possible to prevent the reaction gas that was humidified upstream from being excessively humidified downstream. Examples of a method for gradating the permeability of the humidifying pipe wall portion 32 include reducing the average hole diameter and reducing the hole ratio of the humidifying pipe wall portion 32 from the upstream side toward the downstream side of the reaction gas flow. It is also effective to gradually make the humidifying pipe wall portion 32 thicker from the upstream side toward the downstream side of the reaction gas flow, or gradually make the outer diameter of the humidifying pipe 31 smaller and not change the thickness of the wall portion 32.

This exemplary embodiment describes an example in which the tube-shaped humidifying pipe 31 is uses as the water permeable hollow body. The water permeable hollow body is not limited to being tube-shaped, however. It may be any shape as long as it is a hollow body and water can be supplied inside that portion. Moreover, in this exemplary embodiment both ends of the humidifying pipe 31 are open. Alternatively, however, only one end may be open. In this case, the membrane-electrode assembly can be kept moist by supplying water from the open portion of the water permeable hollow body provided at one end so that it passes through the wall portion of the water permeable hollow body to the outside thereof and humidifies the reactive gas around that area, or by supplying water directly to the membrane-electrode assembly nearby.

Also, the hollow cell module 10 used in the fuel cell of this invention is not limited to the exemplary structure described above. Alternatively, a layer other than the catalyst layers 12 and 13 and the gas diffusion layers 14 and 15 may be provided in order to increase the function of the cell module 10.

Next, the manufacturing method of the cell module 10 will be described. The humidifying pipe 31 is simply inserted into the hollow portion 19 of the hollow cell module 10, however, so a described thereof will be omitted.

First, the membrane-electrode assembly 18 in which a pair of electrodes are provided on an inner surface and an outer surface of the tube-shaped electrolyte membrane 11 is manufactured. The manufacturing method thereof, however, is not particularly limited. For example, the manufacturing method may include a method in which a tube-shaped electrolyte membrane is first prepared and a solution that includes an electrolyte and catalyst particles is coated on both an inner surface and an outer surface of the electrolyte membrane and then dried so as to form catalyst layers. The two catalyst layers are then coated with a solution that includes carbonaceous particles and/or carbonaceous fibers, which is then dried so as to form gas diffusion layers.

An alternative method is as follows. That is, a first electrode is produced by using a material (i.e., a tube-shaped carbonaceous material) formed in a tube shape and which includes carbon material such as carbonaceous particles and/or carbonaceous fibers as the gas diffusion layer of the first electrode (an anode), and then coating the outer surface of the gas diffusion layer with a solution that includes an electrolyte and catalyst particles and drying it to form a catalyst layer. Next, the outer surface of this catalyst layer is then coated with a solution that includes an electrolyte, which is then dried to form an electrolyte membrane layer. Then a catalyst layer of a second electrode (cathode) is formed on the outer surface of this electrolyte membrane layer, and the outer surface of this catalyst layer is coated with a solution that includes carbon material, which is then dried so as to form a gas diffusion layer.

The method for forming the tube-shaped electrolyte membrane is not particularly limited. It is also possible to use a commercial electrolyte membrane that is tube-shaped. Also, tube-shaped carbonaceous material may be obtained by dispersing carbon material such as carbonaceous particles and epoxy and/or a phenol resin in a solvent, forming it into a tube shape, heat-hardening it, and then firing it.

In the manufacturing method of the cell module described above, the solvent used when forming the electrolyte membrane, the catalyst layer, and the gas diffusion layer, may be selected appropriately according to the material to be dispersed and/or dissolved. Also, the application method when forming those layers can also be selected appropriately from various methods such as a spray method and a brush-on method.

The collectors 21 and 22 are adhered to the electrode by, for example, a carbon conductive binding material or Ag paste or the like as described above.

The individual cell modules 10 manufactured and structured as described above are arranged in a casing 50 in sets of an appropriate number to form a cell module assembly 100, as shown in FIG. 2. In this exemplary embodiment, five cell modules 10 are fixed in one casing 50. As will be described in more detail below, the individual cell modules 10 are fixed by having the outer sides of the second electrodes 17 supported by inside plates 54 and 64, and the humidifying pipes 31 supported by side plates 51 and 61 of the casing.

The outer shape of the casing 50 is formed by the pair of side plates 51 and 61, a pair of front plates 52 and 62, and a pair of flat plates 53 and 63, such that the overall shape is that of a rectangular solid. Also, a pair of inside plates 54 and 64 are provided inside the casing 50. All of the plates forming the casing 50 are made of insulating material.

The side plates 51 and 61 include humidifying pipe support holes 55 and 65 which are small diameter holes provided in five locations spaced at predetermined intervals, and fuel gas flow ports 56 and 66 which are large diameter holes provided at end portions. The humidifying pipe support holes 55 and 65 are holes used to support the humidifying pipes 31 of the cell modules 10. The diameter of the humidifying pipe support holes 55 and 65 is generally equivalent to the outer diameter of the humidifying pipes 31. Moreover, the fuel gas flow port 56 is a supply port for fuel gas supplied by fuel gas supplying means, not shown, and the fuel gas flow port 66 is a discharge port for fuel gas that is to be discharged.

The inside plates 54 and 64 are plates the same size as the side plates 51 and 61, and each have five cell module support holes 57 and 67, which are holes that support the outer surface sides of the cell modules 10. The diameter of the cell module support holes 57 and 67 is substantially the same as the outer diameter of the cell modules 10. The inside plates 54 and 64 are arranged parallel with the side plates 51 and 61 of the casing 50 and at predetermined distances away from the side plates 51 and 61.

In this way, the cell modules 10 are fitted through, and fixed to, the holes in the casing 50 in the cell module assembly 100 shown in FIG. 2.

Furthermore, oxidant gas flow ports 58 and 68, which enable the reaction gas (air, in this case) to flow to the outside of the cell module 10, are provided in a region sandwiched between the joints of the pair of inside plates 54 and 64, i.e., in a portion in relatively the center, in the flat plates 53 and 63 of the casing 50.

Although not shown, the collectors 21 and 22 of the individual cell modules 10 are connected in parallel and gathered at one end into an external terminal of the cell module assembly 100.

FIG. 3 is a view illustrating cell module assemblies 100 manufactured in the manner described above and further assembled as a fuel cell 200. In actuality, when used as the fuel cell 200, an appropriate number of cell module assemblies 100 are connected together in parallel. The fuel cell 200 can be made to have a high output voltage by connecting a still greater number of the assembled cell module assemblies 100 together in series.

Next, the mechanism for humidifying during power generation of the cell module 10 according to this exemplary embodiment will be described.

As shown in FIG. 2, with the cell module 10 fixed to the casing 50, an oxidant gas (air, in this case) is supplied from the oxidant gas flow ports 58 to the outer surface side of the cell module 10, while a fuel gas (hydrogen gas, in this case) is supplied from the fuel gas flow ports 56 to one end of the hollow portion 19 of the cell module 10. Also, water is pumped into the hollow portion 39 of the humidifying pipe 31.

The hydrogen gas is supplied from one end of the cell module hollow portion 19, flows along the outer wall of the humidifying pipe 31, and is discharged from the other end. Since the humidifying pipe 31 is made of a water permeable substance, the water that flows through the humidifying pipe hollow portion 39 passes through the wall portion 32 thereof to outside the humidifying pipe 31, i.e., it reaches the cell module hollow portion 19, where it either evaporates or is discharged from the cell module hollow portion as it is in a liquid state.

In the cell module 10 of this exemplary embodiment, the cell module 10 is thus able to be humidified from the inner surface side of the hollow portion 19. As a result, the hydrogen gas can be humidified such that the membrane-electrode assembly 18 can be kept moist.

As illustrated by the exemplary embodiment, the invention makes it possible to prevent a cell module from becoming dry, even if an electrode which does not produce water by electrode reaction is provided on the inner surface side of the cell module, by enabling the cell module to be sufficiently humidified, or wet with water, from the inner surface side of the cell module.

According to the invention, moisture is supplied in this way to within the hollow portion of the cell module, which is a narrow space. As a result, the humidity amount or water supply amount is not affected by the outside atmosphere, thus enabling a stable supply of a specific amount of humidity or water. In contrast, when humidification is performed from the outer surface side of the cell module, the space to be humidified is larger and open, making it more difficult to perform a fixed amount of humidification.

In this exemplary embodiment, either a fuel gas or an oxidant gas may be supplied to the hollow inner portion of the cell module. From the viewpoint of moisture management, however, there is large effect of humidifying the cell module from the inner surface side of the cell module when an electrode which does not produce water is provided on the inner surface side of the cell module and an electrode which does produce water is provided on the outer surface side of the cell module. The anode (fuel electrode) in a typical proton-exchange membrane fuel cell is an electrode which does not produce water. Therefore, when applying the invention to such a proton-exchange membrane fuel cell, it is preferable to make the inner surface side of the cell module be the anode and supply a fuel gas such as hydrogen there, just as in the exemplary embodiment. Supplying the fuel gas into the hollow portion, as is done in this case, is better for sealing in the gas.

Also, the cell module according to the invention may also be a hollow cell module which has a hollow electrolyte and one end of which is closed. In this case, because one end of the hollow inner portion of the cell module is closed, it is preferable that the reaction gas introduced into the hollow inner portion be completely consumed within the tube. Typically only $\frac{1}{3}$ or less of the total capacity of the air used as the oxidant gas is oxygen, and even when all of the oxygen is consumed by the electrode reaction, non-reactive gas, the main component of which is nitrogen, still remains. In view of this, it is preferable to have the reaction gas or reaction fluid introduced into the hollow inner portion be the fuel gas, and have an oxidant gas such as air be supplied to the outer surface side.

The invention claimed is:

1. A cell module for a fuel cell, comprising:
a cell module body which has a tube-shape extending in an axial direction and includes a tube-shaped hollow electrolyte membrane extending in the axial direction, a tube-shaped inner electrode extending in the axial direction and a tube-shaped outer electrode extending in the axial direction, the inner electrode being provided on an inner surface of the hollow electrolyte membrane and the outer electrode being provided on an outer surface of the hollow electrolyte membrane such that the inner electrode is within the outer electrode when viewed in a cross section that is substantially perpendicular to the axial direction, the inner electrode forming a first hollow portion therein that has a tube-shape;
collectors, a respective one of the collectors being in contact with a respective one of the electrodes of the cell module body; and
a water permeable hollow body which has a tube-shape extending in the axial direction, has an outer diameter that is smaller than an inner diameter of the inner electrode, and forms a second hollow portion therein that is configured to supply water, wherein
the tube-shaped water permeable hollow body is co-axial with the tube-shaped inner electrode with a gap sustained therebetween, and
the water permeable hollow body is a separate element from the collectors, and extends into the first hollow portion.

2. The cell module for a fuel cell according to claim 1, wherein the tube-shaped water permeable hollow body has both ends open, and enables water to flow from one end side to the other end side through the second hollow portion.

3. The cell module for a fuel cell according to claim 1, wherein the tube-shaped water permeable hollow body has only one end open.

4. The cell module for a fuel cell according to claim 1, wherein the outer electrode produces water.

5. The cell module for a fuel cell according to claim 4, wherein the inner electrode does not produce water.

6. The cell module for a fuel cell according to claim 1, wherein the water permeability of the water permeable hollow body decreases from an upstream side toward a downstream side with respect to a flow of reaction gas flowing in the first hollow portion.

7. The cell module for a fuel cell according to claim 1, wherein the tube-shaped hollow electrolyte membrane, the tube-shaped inner electrode, the tube-shaped outer electrode and the tube-shaped water permeable hollow body are co-axial.

8. A fuel cell comprising:
the cell module for a fuel cell according to claim 1.

* * * * *